United States Patent
Minamino et al.

(10) Patent No.: US 11,702,530 B2
(45) Date of Patent: Jul. 18, 2023

(54) SURFACE-TREATED CALCIUM CARBONATE AND PRODUCTION METHOD THEREFOR, AND VINYL CHLORIDE-BASED RESIN COMPOSITION AND MOLDED BODY THEREOF

(71) Applicant: SHIRAISHI KOGYO KAISHA, LTD., Osaka (JP)

(72) Inventors: Yutaka Minamino, Amagasaki (JP); Kenichiro Eguchi, Amagasaki (JP); Yoshisada Kayano, Osaka (JP)

(73) Assignee: SHIRAISHI KOGYO KAISHA, LTD., Osaka (JP)

( * ) Notice: Subject to any disclaimer, the term of this patent is extended or adjusted under 35 U.S.C. 154(b) by 0 days.

(21) Appl. No.: 17/607,122

(22) PCT Filed: May 20, 2020

(86) PCT No.: PCT/JP2020/019916
§ 371 (c)(1),
(2) Date: Oct. 28, 2021

(87) PCT Pub. No.: WO2020/241409
PCT Pub. Date: Dec. 3, 2020

(65) Prior Publication Data
US 2022/0220283 A1   Jul. 14, 2022

(30) Foreign Application Priority Data
May 30, 2019 (JP) .................................. 2019-101285

(51) Int. Cl.
C08K 9/04 (2006.01)
C08K 3/26 (2006.01)
C08L 27/06 (2006.01)
C09C 3/08 (2006.01)

(52) U.S. Cl.
CPC .................. *C08K 9/04* (2013.01); *C08K 3/26* (2013.01); *C08L 27/06* (2013.01); *C09C 3/08* (2013.01); *C08K 2003/265* (2013.01)

(58) Field of Classification Search
CPC ...... C08K 9/04; C08K 3/26; C08K 2003/265; C08K 2201/006; C08L 27/06; C09C 3/08; C09C 1/021
USPC ........................................................ 523/201
See application file for complete search history.

(56) References Cited

U.S. PATENT DOCUMENTS

| 10,336,888 B2* | 7/2019 | Utsumi .................... C09C 3/08 |
| 2004/0152821 A1 | 8/2004 | Saegusa et al. |
| 2004/0242748 A1* | 12/2004 | Takahashi ............... C09C 1/021 524/425 |
| 2012/0309877 A1 | 12/2012 | Fujiwara et al. |
| 2017/0174864 A1 | 6/2017 | Sako et al. |
| 2018/0016421 A1 | 1/2018 | Utsumi et al. |

FOREIGN PATENT DOCUMENTS

| CN | 1694927 A | 11/2005 |
| CN | 102762500 A | 10/2012 |
| CN | 107429079 A | 12/2017 |
| CN | 108585474 A | 9/2018 |
| CN | 109650431 A | 4/2019 |
| JP | 8-231760 A | 9/1996 |
| JP | 2002-85980 A | 3/2002 |
| JP | 2002-212461 A | 7/2002 |
| JP | 2002-363372 A | 12/2002 |
| JP | 2004-345932 A | 12/2004 |
| JP | 2010-235836 A | 10/2010 |
| JP | 2016-65154 A | 4/2016 |
| WO | 2004/031303 A1 | 4/2004 |
| WO | 2011/099154 A1 | 8/2011 |
| WO | 2015/129560 A1 | 9/2015 |

OTHER PUBLICATIONS

Notification of Transmittal of Translation of the International Preliminary Report on Patentability (Form PCT/IB/338) issued in counterpart International Application No. PCT/JP2020/019916 dated Dec. 9, 2021, with Forms PCT/IB/373 and PCT/ISA/237. (8 pages).
International Search Report dated Jul. 28, 2020, issued in counterpart International Application No. PCT/JP2020/019916 (3 pages).
Office Action dated Feb. 27, 2023, issued in counterpart CN application No. 202080039904.9. (7 pages).

* cited by examiner

Primary Examiner — Hannah J Pak
(74) Attorney, Agent, or Firm — WHDA, LLP

(57) ABSTRACT

Provided is a surface-treated calcium carbonate that can make a vinyl chloride-based resin composition less colorable in a weathering test and excellent in impact strength. The surface-treated calcium carbonate is a calcium carbonate subjected to treatment with a surface treatment agent in which a proportion of saturated fatty acid contained in a fatty acid is 85% by mass or more, and has a content of elemental iron of 0.01% by mass or less, a content of elemental zinc of 0.1 to 2% by mass introduced by the treatment with the surface treatment agent, and a BET specific surface area of 5 to 30 $m^2/g$.

7 Claims, No Drawings

SURFACE-TREATED CALCIUM CARBONATE AND PRODUCTION METHOD THEREFOR, AND VINYL CHLORIDE-BASED RESIN COMPOSITION AND MOLDED BODY THEREOF

TECHNICAL FIELD

The present invention relates to surface-treated calcium carbonates and production methods therefore, and vinyl chloride-based resin compositions and molded bodies thereof.

BACKGROUND ART

Patent Literature 1 discloses, as a surface-treated calcium carbonate to be compounded into a pasty resin composition, such as polyvinyl chloride sol, a surface-treated calcium carbonate in which 0.5 to 10% by mass zinc component is contained in terms of metal zinc relative to calcium carbonate and calcium carbonate is surface-treated with a fatty acid, an alkali metal soap of the fatty acid or an ester compound of the fatty acid.

The above literature describes that, with the use of such a surface-treated calcium carbonate, the resin composition can be given a high viscosity and good thixotropic properties.

CITATION LIST

Patent Literature

Patent Literature 1: JP-A-2004-345932

SUMMARY OF INVENTION

Technical Problem

The inventors have found that vinyl chloride-based resin compositions containing surface-treated calcium carbonate have a problem of susceptibility to coloration in a weathering test.

An object of the present invention is to provide a surface-treated calcium carbonate that can make a vinyl chloride-based resin composition less colorable in a weathering test and excellent in impact strength.

Solution to Problem

The present invention is directed to a surface-treated calcium carbonate being a calcium carbonate subjected to treatment with a surface treatment agent in which a proportion of saturated fatty acid contained in a fatty acid is 85% by mass or more, the surface-treated calcium carbonate having a content of elemental iron of 0.01% by mass or less, a content of elemental zinc of 0.1 to 2% by mass introduced by the treatment with the surface treatment agent, and a BET specific surface area of 5 to 30 $m^2/g$.

In the present invention, a number of carbon atoms of the saturated fatty acid is preferably 12 to 28.

In the present invention, a content of the surface treatment agent in the surface-treated calcium carbonate is preferably 1 to 12% by mass.

A vinyl chloride-based resin composition according to the present invention contains the above-described surface-treated calcium carbonate according to the present invention.

The vinyl chloride-based resin composition according to the present invention preferably further contains a core-shell polymer composition.

A molded vinyl chloride-based resin body according to the present invention is obtained by molding the above-described vinyl chloride-based resin composition according to the present invention into a window frame, a door frame, a siding, a fence, a pipe or a joint.

A method for producing a surface-treated calcium carbonate according to the present invention is a method enabling production of the above-described surface-treated calcium carbonate according to the present invention and includes surface-treating a calcium carbonate by adding a zinc salt and a surface treatment agent into a slurry of the calcium carbonate.

Advantageous Effects of Invention

The present invention enables provision of a surface-treated calcium carbonate that can make a vinyl chloride-based resin composition less colorable in a weathering test and excellent in impact strength.

DESCRIPTION OF EMBODIMENTS

Hereinafter, a detailed description will be given of the present invention.

<Surface-Treated Calcium Carbonate>

(Calcium Carbonate)

There is no particular limitation as to the type of calcium carbonate for use in the present invention and heretofore known types of calcium carbonate can be used. Specific examples of the calcium carbonate include synthetic calcium carbonate and natural calcium carbonate (ground calcium carbonate). Synthetic calcium carbonate is preferably used in the present invention.

There is no particular limitation as to the type of synthetic calcium carbonate. Examples of the synthetic calcium carbonate include precipitated (colloidal) calcium carbonate and light calcium carbonate. Precipitated calcium carbonate is preferably used in the present invention.

Synthetic calcium carbonate can be produced, for example, by reacting calcium hydroxide with carbon dioxide. Calcium hydroxide can be produced, for example, by reacting calcium oxide with water. Calcium oxide can be produced, for example, by firing raw limestone with coke or the like. In this case, carbon dioxide is generated during the firing. When this carbon dioxide is reacted with calcium hydroxide, calcium carbonate can be produced.

In the present invention, the BET specific surface area of the surface-treated calcium carbonate is 5 to 30 $m^2/g$ and, therefore, the BET specific surface area of calcium carbonate before being treated is also preferably about 5 to 30 $m^2/g$.

In the present invention, the content of elemental iron in the surface-treated calcium carbonate is 0.01% by mass or less. The elemental iron is mostly derived from the calcium carbonate. Therefore, it is preferred to use limestone containing less elemental iron as a raw material or use calcium hydroxide containing less elemental iron as a raw material.

(Surface Treatment Agent)

In the present invention, the calcium carbonate is surface-treated with a surface treatment agent in which a proportion of saturated fatty acid contained in a fatty acid is 85% by mass or more.

If the proportion of saturated fatty acid contained in the fatty acid is less than 85% by mass, this cannot provide the effect of the present invention, thus making a vinyl chloride-based resin composition less colorable in a weathering test and excellent in impact strength. The proportion of saturated fatty acid is preferably 88% by mass or more, more preferably 90% by mass or more, still more preferably 91% by mass or more, and particularly preferably 92% by mass or more. The upper limit of the proportion of saturated fatty acid is not particularly limited, but is preferably not more than 100% by mass and more preferably not more than 99% by mass.

The number of carbon atoms in the saturated fatty acid is preferably 12 to 28, more preferably 14 to 22, and still more preferably 16 to 22.

Specific examples of the saturated fatty acid include caproic acid, caprylic acid, pilargonic acid, capric acid, undecanoic acid, lauric acid, myristic acid, palmitic acid, stearic acid, araic acid, behenic acid, lignoceric acid, cerotic acid, montanoic acid, and melissic acid. Preferably used among them are lauric acid, myristic acid, palmitic acid, stearic acid, and behenic acid.

An example of a fatty acid other than the saturated fatty acid in the fatty acid is an unsaturated fatty acid. Specific examples of the unsaturated fatty acid include obtusilic acid, calroleic acid, undecylenic acid, linderic acid, tsuzuic acid, physeteric acid, myristoleic acid, palmitoleic acid, petroselinic acid, oleic acid, elaidic acid, asclepic acid, vaccenic acid, gadoleic acid, gondoic acid, cetoleic acid, erucic acid, brassidic acid, selacholeic acid, ximenic acid, lumequeic acid, sorbic acid, and linoleic acid.

The surface treatment agent in the present invention preferably contains the fatty acid as a major ingredient. However, the surface-treated calcium carbonate may contain any surface treatment agent other than the fatty acid.

The content of the surface treatment agent in the surface-treated calcium carbonate is preferably 1 to 12% by mass, more preferably 1 to 8% by mass, still more preferably 2 to 6% by mass, and yet still more preferably 2 to 5% by mass. If the amount of surface treatment agent is small, the effect of the present invention, thus making a vinyl chloride-based resin composition less colorable in a weathering test and excellent in impact strength, may not sufficiently be achieved. If the amount of surface treatment agent is too large, the effect of the present invention, thus making a vinyl chloride-based resin composition less colorable in a weathering test, may not sufficiently be achieved.

A method for measuring the amount of surface treatment agent can be implemented by calculating the content of surface treatment agent in the surface-treated calcium carbonate from a reduction in weight of the surface-treated calcium carbonate between when heated at 200° C. and when heated at 500° C. with a thermogravimetric analyzer.

(Surface Treatment Method)

An example of a surface treatment method is a method of adding an aqueous alkali metal salt solution of a fatty acid to a calcium carbonate slurry containing calcium carbonate and water and then dewatering and drying the slurry. The aqueous alkali metal salt solution of a fatty acid can be prepared by adding the fatty acid into an aqueous alkali metal salt solution, such as an aqueous sodium hydroxide solution or an aqueous potassium hydroxide solution, and then heating the solution.

In the present invention, elemental zinc is introduced into the surface-treated calcium carbonate by surface treatment. An example of a method for introducing elemental zinc is a method of surface-treating a calcium carbonate by adding a zinc salt and a surface treatment agent into the calcium carbonate slurry. By the surface treatment, the surface treatment agent is deposited onto the surfaces of calcium carbonate particles and elemental zinc is concurrently introduced into the deposited surface treatment agent.

Alternatively, it is possible that a calcium carbonate slurry after being subjected to surface treatment with a surface treatment agent is dewatered into a wet powder and a zinc salt is added to and mixed with the wet powder. In the present invention, elemental zinc introduced in this manner is also regarded as elemental zinc introduced by surface treatment.

Examples of the zinc salt include zinc chloride, zinc nitrate, and zinc sulfate. The zinc salt may be added concurrently with the surface treatment agent, added before the addition of the surface treatment agent or added after the addition of the surface treatment agent. Generally, the zinc salt is preferably added after the addition of the surface treatment agent.

The zinc salt is preferably added in the form of an aqueous solution. The concentration of the aqueous solution is preferably 10 to 80% by mass.

The zinc salt to be added to the above-described wet powder is preferably an organic zinc salt and particularly preferably an organic acid salt of zinc. Examples of the organic acid salt of zinc include zinc acetate and zinc montanate. Therefore, the number of carbon atoms of the organic acid salt of zinc is preferably 1 to 28 and more preferably 12 to 22.

The content of calcium carbonate solid in the calcium carbonate slurry may be appropriately adjusted in consideration of the average particle diameter of the calcium carbonate, the dispersibility of the calcium carbonate into the slurry, ease of dewatering of the slurry, and so on. Generally, when the solid content in the slurry is adjusted to about 2 to 30% by mass and preferably about 5 to 20% by mass, a slurry having a moderate viscosity can be obtained.

(Content of Elemental Iron)

The content of elemental iron in the surface-treated calcium carbonate according to the present invention is 0.01% by mass or less, preferably 0.0095% by mass or less, more preferably 0.009% by mass or less, still more preferably 0.0085% by mass or less, and particularly preferably 0.0082% by mass or less. If the content of elemental iron is over 0.01% by mass, the effect of the present invention, thus making a vinyl chloride-based resin composition less colorable in a weathering test, cannot be achieved.

The lower limit of the content of elemental iron is not particularly limited, but is, for example, 0.001% by mass.

An example of a method for measuring the content of elemental iron is a method of preparing a measurement solution by adding nitric acid to a dried sample of the calcium carbonate to dissolve the calcium carbonate in nitric acid, and quantifying elemental iron in the measurement solution with an ICP emission spectrophotometer.

(Content of Elemental Zinc)

The content of elemental zinc in the surface-treated calcium carbonate according to the present invention is a content of elemental zinc introduced by surface treatment. Therefore, the content of elemental zinc is a content of elemental zinc contained in the surface-treated layer of the surface-treated calcium carbonate. The content of elemental zinc in the present invention is within a range of 0.1 to 2% by mass, preferably within a range of 0.2 to 1.9% by mass, more preferably within a range of 0.3 to 1.8% by mass, and still more preferably within a range of 0.4 to 1.5% by mass.

If the content of elemental zinc is too small, the effect of the present invention, thus making a vinyl chloride-based resin composition less colorable in a weathering test, may not sufficiently be achieved. If the content of elemental zinc is too large, the vinyl chloride-based resin composition may color at an early time.

The content of elemental zinc in the present invention can be determined by subtracting the content of elemental zinc in the calcium carbonate before being surface-treated from the content of elemental zinc in the entire surface-treated calcium carbonate. Specifically, the content of elemental zinc in the calcium carbonate before being surface-treated and the content of elemental zinc in the calcium carbonate after being surface-treated can be determined by preparing respective measurement solutions for the calcium carbonates before and after being surface-treated by adding nitric acid to a dried sample of each of the calcium carbonates to dissolve the calcium carbonate in nitric acid, and quantifying elemental zinc in the measurement solutions with an ICP emission spectrophotometer. Alternatively, the content of elemental zinc in the surface-treated layer of the surface-treated calcium carbonate may be determined by X-ray photoelectron spectroscopy (XPS).

(BET Specific Surface Area)

The BET specific surface area of the surface-treated calcium carbonate according to the present invention is within a range of 5 to 30 $m^2/g$, preferably within a range of 6 to 25 $m^2/g$, more preferably within a range of 8 to 22 $m^2/g$, and still more preferably within a range of 10 to 20 $m^2/g$.

If the BET specific surface area is too small, the impact resistance of the vinyl chloride-based resin composition may decrease. If the BET specific surface area is too large, the impact resistance and thermal resistance of the vinyl chloride-based resin composition may decrease.

The BET specific surface area can be determined by the BET method using nitrogen gas.

<Vinyl Chloride-Based Resin Composition>

(Vinyl Chloride-Based Resin)

Examples of a vinyl chloride-based resin in the present invention includes vinyl chloride homopolymer and copolymers containing units derived from vinyl chloride in an amount of at least 70% by mass.

(Vinyl Chloride-Based Resin Composition)

The vinyl chloride-based resin composition according to the present invention is a vinyl chloride-based resin composition containing the surface-treated calcium carbonate according to the present invention.

The vinyl chloride-based resin composition according to the present invention preferably further contains a core-shell polymer composition.

The vinyl chloride-based resin composition according to the present invention is more preferably a resin composition containing, relative to 100 parts by mass of vinyl chloride-based resin, 1 to 30 parts by mass of core-shell polymer composition and 1 to 30 parts by mass of the surface-treated calcium carbonate according to the present invention.

The core-shell polymer composition is contained in the resin composition, relative to 100 parts by mass of vinyl chloride-based resin, more preferably in an amount of 1 to 20 parts by mass and still more preferably in an amount of 2 to 10 parts by mass.

If the core-shell polymer composition is too little, high impact strength may not be achieved. If the core-shell polymer composition is too much, the molding processability may decrease or the cost may rise.

The surface-treated calcium carbonate according to the present invention is contained in the resin composition, relative to 100 parts by mass of vinyl chloride-based resin, more preferably in an amount of 2 to 20 parts by mass and still more preferably in an amount of 5 to 15 parts by mass.

If the surface-treated calcium carbonate according to the present invention is too little, the elastic modulus or the impact resistance of the vinyl chloride-based resin composition may decrease. If the surface-treated calcium carbonate according to the present invention is too much, the specific gravity of the vinyl chloride-based resin composition may increase or the molding processability thereof may decrease.

If necessary, additives, such as an antioxidant, a stabilizer, an ultraviolet ray absorber, a pigment, an antistat, a lubricant, and a processing aid, may be appropriately added to the vinyl chloride-based resin composition according to the present invention.

Generally, for the purpose of preventing degradation (discoloration and decrease in mechanical and electrical properties) due to a dehydrochlorination reaction caused by heat during processing or in use, ultraviolet rays, oxygen, or so on), a stabilizer is added to and used in the vinyl chloride-based resin composition. Such stabilizers are classified mainly into a lead compound-based stabilizer, a metallic soap-based stabilizer, an organotin-based stabilizer, and so on. In the present invention, at least one of the lead compound-based stabilizer, the organotin-based stabilizer, and the metallic soap-based stabilizer is preferably used.

(Core-Shell Polymer Composition)

An example of the core-shell polymer composition in the present invention is one obtained by polymerizing a shell-forming constituent in the presence of a core obtained by polymerizing a core-forming constituent. Such a core-shell polymer composition can be produced, for example, by emulsion polymerization, suspension polymerization, microsuspension polymerization, miniemulsion polymerization or aqueous dispersion polymerization. Particularly, a core-shell polymer composition produced by emulsion polymerization can be suitably used because of ease of structural control.

The latex and particles of the core-shell polymer obtained in the above manner are, if necessary, subjected to solidification treatment, such as salting-out or acid deposition, then subjected to heat treatment, cleaning, dewatering, and drying processes, and recovered in the form of powder. The method for recovering the powder is not limited to the above method and, alternatively, the powder can be recovered, for example, by spray drying the core-shell polymer latex.

The core of the core-shell polymer composition preferably has a particle diameter of 0.05 to 0.3 μm in order to develop good impact resistance particularly with the use of a vinyl chloride-based resin.

A substance for use as an impact resistance modifier for polyvinyl chloride can be used as the core-shell polymer composition in the present invention. Examples of the impact resistance modifier described above include those having a core-shell structure in which the core is made of butadiene-based rubber (butadiene-styrene), acrylic rubber or like rubber and the shell is formed of a graft layer of MMA (methyl methacrylate), MMA/styrene, AN (acrylonitrile), AN/styrene, silicone or so on.

Impact resistance modifiers having a core-shell structure include MBS resin (methyl methacrylate-butadiene-styrene copolymer) and acrylic resin. MBS resin is a core-shell fine particle polymer in which the shell is formed of an MMA-based graft layer and the core is made of a butadiene-based rubber (primarily, butadiene/styrene). Acrylic resin can be classified into an acrylic toughener and an acrylic processing aid and both the agents have excellent weather resistance. Acrylic rubber is used as the core layer of the acrylic resin.

EXAMPLES

Hereinafter, a description will be given of specific examples according to the present invention, but the present invention is not limited to these examples.

<Production of Surface-Treated Calcium Carbonate>

(Production of Surface-Treated Calcium Carbonate A)

Water was added to 2000 g of synthetic calcium carbonate (with a zinc content of 0.0007% by mass based on elemental analysis by ICP-AES) having a BET specific surface area of 18 m$^2$/g to give a solid content of 10% by mass, followed by stirring at 60° C., thus preparing a calcium carbonate slurry.

Next, 10% by mass aqueous solution of a saturated fatty acid sodium salt having a content of saturated fatty acid of 92% by mass was prepared as a surface treatment agent solution and 50% by mass aqueous solution of zinc chloride was prepared. A predetermined amount of the surface treatment agent solution was added into the above calcium carbonate slurry and a predetermined amount of the above aqueous solution of zinc chloride was then added to the calcium carbonate slurry, thus surface-treating the synthetic calcium carbonate.

Next, the obtained slurry was dewatered, thus obtaining a cake with a solid content of 60% by mass. The obtained cake was dried by a dryer and pulverized, thus obtaining surface-treated calcium carbonate A.

The BET specific surface area of the obtained surface-treated calcium carbonate A was 16 m$^2$/g. When the surface-treated calcium carbonate A underwent elemental analysis by ICP-AES, its zinc content was 0.6% by mass and its iron content was 0.008% by mass. Furthermore, when the content of the surface treatment agent in the surface-treated calcium carbonate was measured with a thermogravimetric analyzer, it was 4% by mass.

(Production of Surface-Treated Calcium Carbonate B)

Surface-treated calcium carbonate B was obtained in the same manner as for surface-treated calcium carbonate A except that the amount of 50% by mass aqueous solution of zinc chloride added was changed.

The BET specific surface area of the obtained surface-treated calcium carbonate B was 16 m$^2$/g. Its zinc content was 1.8% by mass and its iron content was 0.008% by mass. Furthermore, when the content of the surface treatment agent in the surface-treated calcium carbonate was measured with a thermogravimetric analyzer, it was 4% by mass.

(Production of Surface-Treated Calcium Carbonate C)

Surface-treated calcium carbonate C was obtained in the same manner as for surface-treated calcium carbonate A except that synthetic calcium carbonate having a BET specific surface area of 11 m$^2$/g was used.

The BET specific surface area of the obtained surface-treated calcium carbonate C was 10 m$^2$/g. Its zinc content was 0.6% by mass and its iron content was 0.008% by mass. Furthermore, when the content of the surface treatment agent in the surface-treated calcium carbonate was measured with a thermogravimetric analyzer, it was 4% by mass.

(Production of Surface-Treated Calcium Carbonate D)

Surface-treated calcium carbonate D was obtained in the same manner as for surface-treated calcium carbonate A except that synthetic calcium carbonate having a BET specific surface area of 7 m$^2$/g was used.

The BET specific surface area of the obtained surface-treated calcium carbonate D was 6 m$^2$/g. Its zinc content was 0.6% by mass and its iron content was 0.008% by mass. Furthermore, when the content of the surface treatment agent in the surface-treated calcium carbonate was measured with a thermogravimetric analyzer, it was 4% by mass.

(Production of Surface-Treated Calcium Carbonate E)

Surface-treated calcium carbonate E was obtained in the same manner as for surface-treated calcium carbonate A except that the amount of surface treatment agent solution added was changed.

The BET specific surface area of the obtained surface-treated calcium carbonate E was 16 m$^2$/g. Its zinc content was 0.6% by mass and its iron content was 0.008% by mass. Furthermore, when the content of the surface treatment agent in the surface-treated calcium carbonate was measured with a thermogravimetric analyzer, it was 8% by mass.

(Production of Surface-Treated Calcium Carbonate F)

Surface-treated calcium carbonate F was obtained in the same manner as for surface-treated calcium carbonate A except that the amount of surface treatment agent solution added was changed.

The BET specific surface area of the obtained surface-treated calcium carbonate F was 16 m$^2$/g. Its zinc content was 0.6% by mass and its iron content was 0.008% by mass. Furthermore, when the content of the surface treatment agent in the surface-treated calcium carbonate was measured with a thermogravimetric analyzer, it was 10% by mass.

(Production of Surface-Treated Calcium Carbonate G)

Surface-treated calcium carbonate G was obtained in the same manner as for surface-treated calcium carbonate A except that the amount of 50% by mass aqueous solution of zinc chloride added was changed.

The BET specific surface area of the obtained surface-treated calcium carbonate G was 16 m$^2$/g. Its zinc content was 2.5% by mass and its iron content was 0.008% by mass. Furthermore, when the content of the surface treatment agent in the surface-treated calcium carbonate was measured with a thermogravimetric analyzer, it was 4% by mass.

(Production of Surface-Treated Calcium Carbonate H)

Surface-treated calcium carbonate H was obtained in the same manner as for surface-treated calcium carbonate A except that synthetic calcium carbonate having a high content of iron was used.

The BET specific surface area of the obtained surface-treated calcium carbonate H was 16 m$^2$/g. Its zinc content was 0.6% by mass and its iron content was 0.013% by mass. Furthermore, when the content of the surface treatment agent in the surface-treated calcium carbonate was measured with a thermogravimetric analyzer, it was 4% by mass.

(Production of Surface-Treated Calcium Carbonate I)

Surface-treated calcium carbonate I was obtained in the same manner as for surface-treated calcium carbonate A except that a saturated fatty acid sodium salt having a content of saturated fatty acid of 80% by mass was used.

The BET specific surface area of the obtained surface-treated calcium carbonate I was 16 m$^2$/g. Its zinc content was 0.6% by mass and its iron content was 0.008% by mass. Furthermore, when the content of the surface treatment agent in the surface-treated calcium carbonate was measured with a thermogravimetric analyzer, it was 4% by mass.

(Production of Surface-Treated Calcium Carbonate J)

Surface-treated calcium carbonate J was obtained in the same manner as for surface-treated calcium carbonate A except that synthetic calcium carbonate having a BET specific surface area of 35 m$^2$/g was used.

The BET specific surface area of the obtained surface-treated calcium carbonate J was 32 m$^2$/g. Its zinc content was 0.6% by mass and its iron content was 0.008% by mass. Furthermore, when the content of the surface treatment agent in the surface-treated calcium carbonate was measured with a thermogravimetric analyzer, it was 4% by mass.

(Production of Surface-Treated Calcium Carbonate K)

Surface-treated calcium carbonate K was obtained in the same manner as for surface-treated calcium carbonate A except that commercially available ground calcium carbonate having a BET specific surface area of 3 $m^2/g$ was used as calcium carbonate before being surface-treated.

The BET specific surface area of the obtained surface-treated calcium carbonate K was 4 $m^2/g$. Its zinc content was 0.5% by mass and its iron content was 0.008% by mass. Furthermore, when the content of the surface treatment agent in the surface-treated calcium carbonate was measured with a thermogravimetric analyzer, it was 3% by mass.

(Production of Surface-Treated Calcium Carbonate L)

Surface-treated calcium carbonate L was obtained in the same manner as for surface-treated calcium carbonate A except that synthetic calcium carbonate obtained by adding a 50% by mass aqueous solution of zinc chloride during synthesis was used and no zinc chloride was added during surface treatment. The zinc content in the synthetic calcium carbonate before being surface-treated was 1.0% by mass.

The BET specific surface area of the obtained surface-treated calcium carbonate L was 26 $m^2/g$. Its zinc content was 1.0% by mass and its iron content was 0.009% by mass. Furthermore, when the content of the surface treatment agent in the surface-treated calcium carbonate was measured with a thermogravimetric analyzer, it was 4% by mass.

(Production of Surface-Treated Calcium Carbonate M)

Surface-treated calcium carbonate M was obtained by adding, to calcium carbonate powder obtained in the same manner as for surface-treated calcium carbonate A except that the surface treatment was performed using the surface treatment agent only without adding zinc chloride, a predetermined amount of zinc stearate with a mixer, followed by mixing.

The BET specific surface area of the obtained surface-treated calcium carbonate M was 16 $m^2/g$. Its zinc content was 0.5% by mass and its iron content was 0.008% by mass. Furthermore, when the content of the surface treatment agent in the surface-treated calcium carbonate was measured with a thermogravimetric analyzer, the content of the surface treatment agent was 4% by mass and the content of stearate component in the added zinc stearate was 4% by mass.

(Production of Surface-Treated Calcium Carbonate N)

Surface-treated calcium carbonate N was obtained in the same manner as for surface-treated calcium carbonate A except that the amount of 50% by mass aqueous solution of zinc chloride added was reduced.

The BET specific surface area of the obtained surface-treated calcium carbonate N was 16 $m^2/g$. Its zinc content was 0.08% by mass and its iron content was 0.008% by mass. Furthermore, when the content of the surface treatment agent in the surface-treated calcium carbonate was measured with a thermogravimetric analyzer, it was 4% by mass.

(Production of Surface-Treated Calcium Carbonate O)

Water was added to 2000 g of synthetic calcium carbonate (with a zinc content of 0.0007% by mass based on elemental analysis by ICP-AES) having a BET specific surface area of 18 $m^2/g$ to give a solid content of 10% by mass, followed by stirring at 60° C., thus preparing a calcium carbonate slurry.

Next, 10% by mass aqueous solution of a saturated fatty acid sodium salt having a content of saturated fatty acid of 92% by mass was prepared as a surface treatment agent solution. A predetermined amount of the surface treatment agent solution was added into the above calcium carbonate slurry, thus surface-treating the synthetic calcium carbonate.

The calcium carbonate slurry into which the surface treatment agent solution was added was subjected to dewatering filtration, thus obtaining a cake (wet powder) of calcium carbonate with a solid content of 60% by mass. A predetermined amount of zinc stearate powder was added to the obtained calcium carbonate cake (wet powder) and the mixture was then dried and pulverized, thus obtaining surface-treated calcium carbonate O.

The BET specific surface area of the obtained surface-treated calcium carbonate O was 16 $m^2/g$. Its zinc content was 0.5% by mass and its iron content was 0.008% by mass. Furthermore, when the content of the surface treatment agent (inclusive of stearate component in zinc stearate) in the surface-treated calcium carbonate was measured with a thermogravimetric analyzer, it was 8% by mass.

<Production of Vinyl Chloride-Based Resin Composition>

Using surface-treated calcium carbonates A to O obtained in the above manners, respective vinyl chloride-based resin compositions were produced in the following formulation. Surface-treated calcium carbonates A to F and O are surface-treated calcium carbonates according to the present invention, and surface-treated calcium carbonates G to N are surface-treated calcium carbonates as comparative examples.

Vinyl chloride resin (trade name "Kanevinyl S-1001", manufactured by Kaneka Corporation): 100 parts by mass Core-shell polymer composition (tradename "Kane Ace FM-40", white resin powder, manufactured by Kaneka Corporation): 3.5 parts by mass Surface-treated calcium carbonates A to N: 10 parts by mass Organic tin-based stabilizer (tradename "TM-181FSJ", methyltin mercapto-based stabilizer, manufactured by Katsuta Kako Co., Ltd.): 1.5 parts by mass Paraffin wax (tradename "Rheolub 165", manufactured by Rheochem): 1.0 part by mass Calcium stearate (tradename "SC-100", manufactured by Sakai Chemical Industry Co., Ltd.): 1.2 pats by mass Oxidized polyethylene wax (tradename "ACPE-629A", manufactured by AlliedSignal, Inc.): 0.1 parts by mass Titanium dioxide (tradename "TITON R-62N", manufactured by Sakai Chemical Industry Co., Ltd.): 10 parts by mass Processing aid (tradename "Kane Ace PA-20", manufactured by Kaneka Corporation): 1.5 parts by mass The above raw materials were blended with a Henschel mixer, thus obtaining a raw material mixture. The obtained raw material mixture was kneaded with a 20 mm co-rotating twin-screw extruder under conditions of an extrusion temperature of 170° C., a screw rotation speed of 100 rpm, and a feed rate of 5 kg/h, thus obtaining pellets of a vinyl chloride-based resin composition.

Using the obtained pellets, a molded body was made with an injection molder having a mold clamping force of 75 tons. As a molded body for use in measuring the Charpy impact strength, a 4 mm thick test specimen was obtained with a mold conforming to ISO A. As a molded body for use in the weathering test, a plate-shaped molded body of 2 mm thickness, 50 mm length, and 50 mm width was obtained with a mold conforming to ISO D2.

(Measurement of Charpy Impact Strength)

The measurement of the Charpy impact strength was conducted using notched test specimens in conformity to ISO 179-1 and 179-2. The unit of the strength adopted was $kJ/m^2$.

The measurement results are shown in Table 1.

(Weathering Test)

In the weathering test, the b* value of each molded body was measured before and after 1000 hours exposure to a Super Xenon Weather Meter (SX75 manufactured by Suga Test Instruments Co., Ltd.) set to conditions of an irradiance of 75 W/m² (wavelength: 300 to 400 nm), a black panel temperature of 63° C., and a humidity of 50% RH. The b* value was determined, with a white-light spectrophotometer (ERP-80WX/II, manufactured by Tokyo Denshoku Co., Ltd.) in which illuminant C was used as a standard illuminant, a condenser lens was set at φ30, and a stage was set at φ30, in conformity to JIS Z 8781.

The measurement results are shown in Table 1. The term "Content of elemental zinc" shown in Table 1 refers to the content of elemental zinc introduced into calcium carbonate by surface treatment. As for each of the surface-treated calcium carbonates other than Comparative Example 6 (surface-treated calcium carbonate L), the content of elemental zinc in calcium carbonate before being surface-treated was as slight as 0.0007% by mass as described above and was therefore considered to be the same value as the content of elemental zinc in surface-treated calcium carbonate. As for Comparative Example 6 (surface-treated calcium carbonate L), the content of elemental zinc introduced by surface treatment was 0% by mass and a value "(1.0)" in its "Content of elemental zinc" shows that the content of elemental zinc in the calcium carbonate before being surface-treated was 1.0% by mass.

invention was used, the effect of the present invention, thus making a vinyl chloride-based resin composition less colorable in the weathering test, could not be achieved.

A comparison between Example 7 and Comparative Example 7 shows that the effect of the present invention can be achieved also by introduction of elemental zinc into calcium carbonate by adding an organic acid salt of zinc to a wet powder of the calcium carbonate. This can be attributed to the fact that by adding an organic acid salt of zinc to the wet powder, the organic acid salt of zinc is homogeneously dispersed into the surfaces of calcium carbonate particles.

(Window Frame Molded Body)

The resin composition used in Example 1 was molded to make a window frame molded body. When the obtained window frame molded body underwent a weathering test, the same result as described above was obtained.

The invention claimed is:

1. A surface-treated calcium carbonate being a calcium carbonate subjected to treatment with a surface treatment agent in which a proportion of saturated fatty acid contained in a fatty acid is 85% by mass or more, the surface-treated calcium carbonate having a content of elemental iron of 0.001 to 0.01% by mass, a content of elemental zinc of 0.1 to 2% by mass introduced by the treatment with the surface treatment agent, and a BET specific surface area of 5 to 30 m²/g.

TABLE 1

|  |  | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Surface-Treated Calcium Carbonate | Type | A | B | C | D | E | F | O | G |
|  | Content of elemental zinc (% by mass) | 0.6 | 1.8 | 0.6 | 0.6 | 0.6 | 0.6 | 0.5 | 2.5 |
|  | Content of elemental iron (% by mass) | 0.008 | 0.005 | 0.008 | 0.008 | 0.008 | 0.008 | 0.0008 | 0.008 |
|  | Proportion of saturated fatty acid (% by mass) | 92 | 92 | 92 | 92 | 92 | 92 | 92 | 92 |
|  | BET specific surface area (m²/g) | 16 | 16 | 10 | 6 | 18 | 16 | 16 | 16 |
|  | Amount of surface treatment agent (% by mass) | 4 | 4 | 4 | 4 | 8 | 10 | 8 | 4 |
| Charpy Impact Strength (kJ/m²) |  | 90 | 88 | 95 | 92 | 92 | 90 | 89 | 60 |
| b* | Before weathering test | 3.2 | 3.9 | 3.4 | 3.4 | 3.0 | 3.9 | 3.4 | 6.0 |
|  | After weathering test | 5.8 | 6.1 | 5.5 | 5.2 | 6.2 | 6.5 | 6 | 6.8 |

|  |  | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Surface-Treated Calcium Carbonate | Type | H | I | J | K | L | M | N |
|  | Content of elemental zinc (% by mass) | 0.6 | 0.6 | 0.6 | 0.5 | 0(1.0) | 0.5 | 0.08 |
|  | Content of elemental iron (% by mass) | 0.013 | 0.008 | 0.005 | 0.008 | 0.009 | 0.008 | 0.006 |
|  | Proportion of saturated fatty acid (% by mass) | 92 | 80 | 92 | 92 | 92 | 92 | 92 |
|  | BET specific surface area (m²/g) | 16 | 16 | 32 | 4 | 26 | 18 | 16 |
|  | Amount of surface treatment agent (% by mass) | 4 | 4 | 4 | 3 | 4 | 4 | 4 |
| Charpy Impact Strength (kJ/m²) |  | 88 | 86 | 24 | 22 | 35 | 28 | 90 |
| b* | Before weathering test | 4.0 | 4.2 | 4.9 | 3.1 | 3.3 | 6.5 | 3.6 |
|  | After weathering test | 20 | 32 | 30 | 11 | 18 | 6.1 | 25 |

As shown in Table 1, it can be seen that, in Examples 1 to 7 where surface-treated calcium carbonates A to F and O according to the present invention were used, vinyl chloride-based resin compositions less colorable in the weathering test and excellent in impact strength were obtained. It can be seen that, in Comparative Example 1 where surface-treated calcium carbonate G having a larger content of elemental zinc than the range of the present invention was used and in Comparative Example 7 where zinc stearate was later added to calcium carbonate powder with a mixer, vinyl chloride-based resin compositions had already colored before the weathering test. It can be seen that, in Comparative Example 8 where surface-treated calcium carbonate having a smaller content of elemental zinc than the range of the present 2. The surface-treated calcium carbonate according to claim 1, wherein a number of carbon atoms of the saturated fatty acid is 12 to 28.

3. The surface-treated calcium carbonate according to claim 1, wherein a content of the surface treatment agent in the surface-treated calcium carbonate is 1 to 12% by mass.

4. A vinyl chloride-based resin composition containing the surface-treated calcium carbonate according to claim 1.

5. The vinyl chloride-based resin composition according to claim 4, wherein the composition further contains a core-shell polymer composition.

6. A molded vinyl chloride-based resin body obtained by molding the vinyl chloride-based resin composition according to claim 4 into a window frame, a door frame, a siding, a fence, a pipe or a joint.

7. A method for producing the surface-treated calcium carbonate according to claim 1, the method comprising surface-treating a calcium carbonate by adding a zinc salt and a surface treatment agent into a slurry of the calcium carbonate, wherein the surface treatment agent includes a proportion of saturated fatty acid contained in a fatty acid is 85% by mass or more, the surface-treated calcium carbonate having a content of elemental iron of 0.001 to 0.01% by mass, a content of elemental zinc of 0.1 to 2% by mass introduced by the treatment with the surface treatment agent, and a BET specific surface area of 5 to 30 $m^2/g$.

* * * * *